(12) United States Patent
Boyer et al.

(10) Patent No.: US 9,298,721 B2
(45) Date of Patent: Mar. 29, 2016

(54) PRIORITIZED SEARCH RESULTS BASED ON MONITORED DATA

(75) Inventors: Monty Boyer, Saratoga, CA (US); Robert Haitani, Menlo Park, CA (US); Alexandre Roux, Ledignan (FR); Jeffrey Finkelstein, San Francisco, CA (US); William (Kam) Stewart, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1723 days.

(21) Appl. No.: 11/680,603

(22) Filed: Feb. 28, 2007

(65) Prior Publication Data

US 2008/0208834 A1 Aug. 28, 2008

(51) Int. Cl.
*G06F 17/30* (2006.01)

(52) U.S. Cl.
CPC .... *G06F 17/30144* (2013.01); *G06F 17/30106* (2013.01)

(58) Field of Classification Search
CPC ............. G06F 17/30144; G06F 17/30106; G06F 17/30867; G06F 17/30554; G06F 3/04842; G06F 3/0485; G06F 3/011; G06F 3/04815; G06F 3/0487; G06F 3/0482; G06F 3/0481; G06F 3/0484; G06F 9/4443
USPC .......... 707/723, 726, 727, 735, 751, 999.003, 707/999.007, 999.107
See application file for complete search history.

(56) References Cited

U.S. PATENT DOCUMENTS

| | | | |
|---|---|---|---|
| 5,727,202 A | 3/1998 | Kucala | |
| 5,729,735 A | 3/1998 | Meyering | |
| 5,758,150 A | 5/1998 | Bell et al. | |
| 5,870,759 A | 2/1999 | Bauer et al. | |
| 5,870,765 A | 2/1999 | Bauer et al. | |
| 5,974,238 A | 10/1999 | Chase, Jr. | |
| 6,148,294 A * | 11/2000 | Beyda et al. | |
| 6,212,529 B1 | 4/2001 | Boothby | |
| 6,401,104 B1 | 6/2002 | LaRue et al. | |
| 6,401,118 B1 | 6/2002 | Thomas | |
| 6,532,480 B1 | 3/2003 | Boothby | |
| 6,710,788 B1 * | 3/2004 | Freach ................. | G06F 3/0481 715/778 |
| 6,799,190 B1 | 9/2004 | Boothby | |
| 6,928,452 B2 | 8/2005 | De La Huerga | |
| 7,237,240 B1 * | 6/2007 | Chen ..................... | G06F 9/4443 707/999.001 |
| 2002/0151334 A1 | 10/2002 | Sharma | |
| 2003/0115224 A1 | 6/2003 | Obara et al. | |
| 2003/0126180 A1 | 7/2003 | Bogart et al. | |
| 2004/0024795 A1 | 2/2004 | Hind et al. | |
| 2004/0049728 A1 | 3/2004 | Langford | |
| 2004/0267730 A1 * | 12/2004 | Dumais et al. ................. 707/3 | |
| 2005/0027702 A1 | 2/2005 | Jensen et al. | |

(Continued)

OTHER PUBLICATIONS

Free Online Dictionary.com, Prioritize, 1991, p. 1-2. http://www.thefreedictionary.com/prioritize.*

(Continued)

*Primary Examiner* — Kannan Shanmugasundaram
*Assistant Examiner* — Amanda Willis
(74) *Attorney, Agent, or Firm* — Mahamedi Paradice LLP

(57) ABSTRACT

The usage of applications in a computing environment is monitored to generate data that is indicative of the application usage. The data is used to select or prioritize applications (or data items of a data type of the applications) over other applications (or data items) when a search operation is performed.

24 Claims, 4 Drawing Sheets

(56) References Cited

U.S. PATENT DOCUMENTS

| | | | |
|---|---|---|---|
| 2005/0033780 A1 | 2/2005 | Simelius et al. | |
| 2005/0066283 A1* | 3/2005 | Kanamaru | G06F 9/445 715/749 |
| 2005/0091272 A1 | 4/2005 | Smith et al. | |
| 2005/0171933 A1 | 8/2005 | Stepanich et al. | |
| 2005/0246396 A1 | 11/2005 | Oreizy et al. | |
| 2006/0129533 A1* | 6/2006 | Purvis | 707/3 |
| 2006/0200556 A1* | 9/2006 | Brave et al. | 709/224 |

OTHER PUBLICATIONS

Final Office Action dated May 27, 2009 in U.S. Appl. No. 11/316,280, 15pages.

International Search Report and Written established by International Searching Authority□PCT/US2006/062371, Feb. 25, 2008, 10pages.

Non-Final Office Action dated Nov. 27, 2009 in U.S. Appl. No. 11/316,280, 14pgs.

Non-Final Office Action dated Jul. 21, 2008 in U.S. Appl. No. 11/316,280, 14pgs.

Non-Final Office Action dated Sep. 4, 2007 in U.S. Appl. No. 11/316,280, 16pgs.

Troy Sauliner, Ander Trudel and Jason Zwicker, A Dynamic intelligent frequency based search engine, Nov. 1999.

Final Office Action dated Jul. 26, 2010 in U.S. Appl. No. 11/316,280, 16 pages.

* cited by examiner

PRIORITIZED SEARCH RESULTS BASED ON MONITORED DATA

TECHNICAL FIELD

The disclosed embodiments relate generally to the field of programmatic search. In particular, the disclosed embodiments relate to an enhanced search system and method for providing search results with selectivity and/or prioritization of search and display operations.

BACKGROUND

Numerous software programs and packages exist to enable search for data items, documents and other data items. Typical search systems enable keyword searching, where a user may specify a combination of words or character strings as search criteria. To enable a user to locate a desired data item in a search result containing numerous matching entries, many programs (e.g. GOOGLE DESKTOP) enable a user to filter the search result by data type, or to further refine a search result.

In the context of mobile computing devices and small-form factor devices, typical search programs can be cumbersome to use. Because of the small display size, the screen is capable of displaying only a relatively small number of entries. Moreover, the entries in the search result are not usually sorted. For this reason, searching on mobile devices (or other small form-factor) devices often requires heavy scrolling activity.

DETAILED DESCRIPTION

Figure 1:
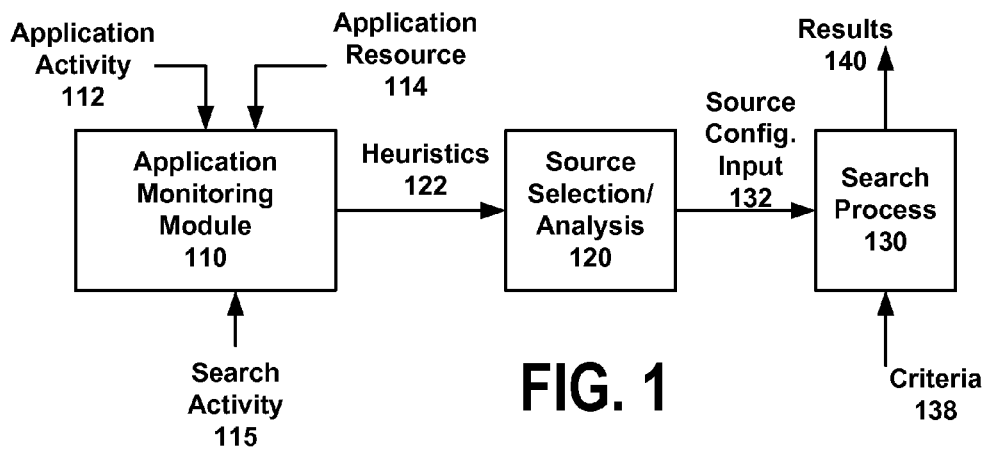
FIG. 1 illustrates an enhanced search process that can be implemented on a computing device, according to one or more embodiments of the invention.

Embodiments described herein provide an enhanced search system and method for performing searches and/or providing search results with selectivity and prioritization. More specifically, one or more embodiments monitor application usage in a computing environment to record information that is indicative of what applications are most extensively or recently used, or otherwise preferred by the user. Applications (or data items of a data type of the application) are selected or prioritized over other applications (or data items) when a search operation is subsequently performed.

According to embodiments, the usage of applications in a computing environment is monitored to identify commonly, recently, and/or extensively used applications. In one embodiment, when a search operation is to be performed for a user-specified search criteria, the search operation is limited (at least initially) to data items that are for applications identified by the monitoring. Such an embodiment may reduce the overall search time, as well as the overall display real-estate required to display a search result to the user. A reduction in the size of the search result may be more suitable when the device has a small screen display size, so as to lessen the amount of scrolling or page views needed by the user to view the search result.

In another embodiment, when a search operation is to be performed for a user-specified search criteria, the search operation is configured to reflect a prioritization for data items that are identified by the application(s) that are most commonly, extensively or recently used. For example, the search operation(s) may attempt to locate data items that match the search result using applications that are indicated as being preferred (e.g. most recently used) by the information recorded from the monitoring activities. The search operation may attempt to locate data items from other applications (i.e. non-preferred applications) only if the preferred applications fail to locate a sufficient number of matching data items, or if the user does not find the desired item from entries returned for the preferred applications. As another example, prioritization is reflected in a progressive reveal of a search result. Data items designated to have priority (e.g. because they are associated with applications that are determined to be recently or extensively used) may be displayed first in time. The user may select from entries for these applications, or wait until matching entries from other applications are progressively revealed in time.

According to another embodiment, a system is provided in a computing environment that includes a monitoring module, a source selection and analysis module, and a search module. The monitoring module is configured to record information about a usage of individual applications in a group of applications that are operable in the computing environment. The source selection and analysis module is configured to use the recorded information to perform at least one operation of (i) indicating a priority of one or more applications in the group over other applications, or (ii) indicating a selection of at least one application in the group to the exclusion of one or more other applications in the group. The source selection and analysis module may generate data that corresponds to the priority and/or the selection. A search module is configured to use one or more search criteria in performing one or more search operations. The search module may be configured to generate a search result from performing the one or more search operations. The search module is coupled to receive the data from the source selection and analysis module. Additionally, the search module may be configured by the data when either performing the one or more search operations or generating the search result.

Still further, another embodiment provides that a user's past search activity is monitored and used to enhance future search activity. In one embodiment, the user's selection of an entry contained in a search result is monitored. From monitored selection(s), an application or an application data type of a data item is identified by the entry of the user's selection. When a subsequent search request is received from the user, a search of a collection of data items is performed, and the search is configured to select or prioritize data items from the collection based on the recorded information of the past search activity.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

As used herein, the term "computing environment" means a computing device or computer, or a group of computers and devices that are interconnected. An example of a computing environment is a mobile computing device, such as a cellular messaging and telephony device.

Methods, steps of methods, processes, sub-processes and techniques may all be programmatically implemented or facilitated by embodiments of the invention, In this regard, one or more embodiments described herein may be implemented in whole or in part through the use of instructions that are executable by one or more processors. These instructions may be carried on a computer-readable medium. Machines, devices, processors, and other programmatic components shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

As used herein, the term "programmatic", "programmatically" or variations thereof means though the use of computer-implemented instructions.

Overview

FIG. 1 illustrates an enhanced search process or system that can be implemented on a computing device, according to one or more embodiments of the invention. According to one or more embodiments, a search process such as described with an embodiment of FIG. 1 introduces intelligence in selecting and/or prioritizing the data items and data files that are searched for a particular search request. Among other benefits, embodiments described herein reduce search time and the amount processing resources needed to provide a successful search result, Moreover, embodiments such as described herein enable a search result to be produced in which the number of entries are reduced and/or prioritized to reflect a determination of relevancy. Such embodiments reduce the amount of display area needed to provide the search result, and enables a user to select a successful search result entry with less scrolling activity.

According to an embodiment, a system executes an application resource monitoring module 110, a system selection or analysis module 120, and a search module 130. The modules combine to enable a more intelligent search to be performed for a user query. More specifically, the modules may combine to provide a search system that implements prioritization and/or selectivity of items that are searched and/or returned as part of the search result. Each of the monitoring module 110, selection/analysis module 120, and the search module 130 may be performed by one or more applications or components, and even on more than one device. In one embodiment, the monitoring module 110 data items data about user activities on the computing environment.

In one embodiment, the monitoring module 110 data items data about applications that are used (application usage data 112). Any type of application may be monitored, whether the application interacts directly with a user or not. Examples of applications that may be monitored include messaging applications, telephony applications, contact applications, list or memo applications, word processing and document applications, web browser, and global positioning system (GPS) application.

The application usage data 112 reflects activities that indicate usage of an application or application resource. The level of monitoring that is performed by the monitoring module 110 may vary. In one implementation, what is data itemed is each instance that a particular application is opened or executed. In another implementation, more sophisticated monitoring may be used, where the type or extend of activity (e.g. duration of time) is data itemed.

The application usage data 112 may data item, for example, any one or more of the following: (i) the number of instances each application in the computing environment was used, (ii) the number of instances in a given time period that each application in the computing environment was used, (iii) the extent of individual uses of the applications, such as measured by the amount of time an application is opened, the amount of inputs entered by the user for an application, or the amount of active processing operations performed when the application was being executed, and (iv) the last instance that each application was used.

As an alternative or addition to application usage data 112, one or more embodiments provide that application resource data 114 is also data itemed. The application resource data 114 may reflect monitoring of resources that affect or indicate interest in a particular application. As an example, application resource data 114 may include information pertaining to use of a plug-ins that is operated in the given computing environment. As another example, a particular application resource, such as a data file, may be capable of being used by multiple applications. When such resource is used, it may be data itemed as being indicative of use of a primary application, and/or of the particular application that it was used with. For example, documents may be associated with a primary application (e.g. word processing document), but used with an email application when a user emails a file without opening the document. Under one implementation, use of the document in the email application may be data itemed as being indicative of use of the primary application.

According to another embodiment, another type of activity that may be monitored is previous user search activity 115. In one embodiment, previous search results, and items selected by the user from those results, are data itemed and/or analyzed. Information data itemed may include the data type of the data items or files most frequently or recently selected by the user as part of a previous search process.

According to an embodiment, the application monitoring module 110 generates heuristics 122 from the application usage data 112, application resource data 114, and/or search activity data 115. The heuristics 122 provide information about the various kinds of applications that are used or are of interest in the given computing environment. The heuristics 122 may be used by the selection/analysis module 120 to implement selectivity and/or priority for use with the search module 130. In one embodiment, the heuristics 122 may be obtained by aggregating, filtering and/or analyzing application usage data 112, application resource data 114, and past search activity data 115.

The selection/analysis module 120 uses the heuristics 122 to develop and implement a priority or selectivity scheme for designating data items and data items that are to be used by the search module 130. In one embodiment, the selection/analysis module 120 identifies specific applications or application resources to the search algorithm 130, for purpose of implementing the prioritization or selectivity scheme for use by the search module 130.

In utilizing the heuristics 122, the selection/analysis module 120 makes a quantitative measure as to the extent of use of at least some applications that operate in the computing environment. For example, the selection/analysis module 120 may rank some or all of the applications that are available for use in a particular operating environment, based on the extent of each application's use. Alternatively, selection/analysis module 120 identifies a designated number of the most extensively used applications. Still further, the selection/analysis module 120 identifies a number of the most recently used applications. Accordingly, the output of the search/analysis system may correspond to search configuration input 132. The search configuration input 132 may select or prioritize a list of applications (e.g. provide a list of application identifiers). Alternatively, the search configuration input 132 may identify file types or the locations of data items that are to be searched, based on knowledge of resources used by identified applications.

The search system 130 may be executed when a user enters a criteria 138. The criteria 138 may correspond to, for example, a string of characters (e.g. word or phrase) that may correspond to content of a specific data item or item. Alternatively, the criteria 138 may specify a tag or metadata (e.g. file type) associated with a desired data item or item. The criteria may be entered by a user on-the-fly. In one embodiment, the search system 130 includes modules that scan data items of various file types to data that matches a search query. In another embodiment, the search system 130 scans an index or other data structure that stores data from various data items and files. Still further, in another embodiment, the search system 130 is based on internal search algorithms of individual applications. In the latter case, many applications include internal search algorithms that search data of file type used by the particular application. The search system 130 may simply query each of those applications with a criteria that corresponds or is based on the criteria 138 entered by the user. Each application may then return a query response, which is used to formulate a search result 140.

The search configuration input 132 may be used to configure operation of the search system 130. In one embodiment, the search configuration input 132 identifies a set of applications that represent only a portion of the total number of applications that are available to the search system. As an alternative or addition, the search configuration input 132 ranks one or more applications that can be searched. In this way, the source of data items and items that can be searched by the search system 130 are made selective or subject to a priority scheme.

In response to receiving criteria 138, the search system 130 may be executed to identify data items, documents or other files that contain or are otherwise associated with data that satisfy the criteria. The search result 140 may be returned comprising one or more matching or related entries. Each entry may correspond to, and/or identify a data item, document, file or other data item. In order to generate the search result 140, the search process may use the criteria 138 against data contained in, related to, or otherwise associated with individual data items, documents, files or data items. As described above, any one of many possible search systems may be used to identify items that form the entries for the search result 140.

According to an embodiment, the search system 130 uses the search configuration input 132 to select and/or prioritize portions of the totality of data items and items that are to be searched. To prioritize its search, the search system 130 may use the search configuration input 132 to identify what application data items, documents or files to search first. For example, the search system 130 may search data items (identified by type or location) used by the most recently and/or extensively used application(s). In one embodiment, the search system 130 implements a priority scheme in which all application data items are searched, but the result 140 data items entries in an order that is determined by the search configuration input 132 (e.g. most recently used applications). In another embodiment, the search system 130 searches all data items, but the entries of result 140 are temporally displayed as they are found. The search algorithm 130 may prioritize which application data items or files are searched first in time.

The heuristics 122 may be used to limit the search. In one embodiment, the search algorithm 130 may stop executing once it finds a first matching data item or file, or a designated number of data items or files. This can limit the amount of time needed to execute the search algorithm 130. Additionally, the size of the search result 140 may be limited if desirable. This may be desirable when, for example, a small form factor device (e.g. cell phone) is in use, and the search result 140 is to occupy a portion of a single display. Additionally, the breadth of the application data items and files that are searched may be iteratively widened if insufficient matching data items are found when the search is initiated of the most recent or extensively used applications.

In one embodiment, heuristics 122 also implement selectivity in what applications and application data resources are to be used for the search. The search configuration input 132 specifies one or more applications that are most likely used or preferred by the user. When criteria 138 is entered, the search system 130 searches only data of a type that corresponds to the one or more specific applications. In another implementation, the search configuration input 132 may direct the search system 130 to prioritize or be selective in the applications that are to be directed to perform a search. For example, the search configuration 138 may identify a set of most recent or most commonly used applications. In one implementation, the search system 130 queries only those applications in the set for a search result. Alternatively, the order of the applications queried may depend on an order or ranking specified in the configuration input 132. Still further, in another implementation, the search system 130 may scan an index or the data items for data types that are used by each of the applications specified by the search configuration input 132. In another implementation, the search system 130 initiates its search using the applications specified by the configuration input 132, and progresses to other applications after performing the search on those identified applications. Various combinations of the selectivity and/or priority schemes described may also be implemented.

In either case, the volume of data items searched is significantly reduced and/or prioritized. Otherwise, without the search configuration input 132, the search system 130 may perform an unnecessarily large search, without considering most likely sources for performing the search first. For example, the search may be time consuming, or it may return too many results, because all data items and files are considered without any consideration for selectivity or priority. Among other benefits, on a small device, for example, only a limited number data items can be identified on one display screen. According to an embodiment such as described with FIG. 1, entries that are most likely to be relevant or desired by the user occupy initial positions in the search result 140, so that such entries are likely displayed immediately on the display screen.

Figure 2:
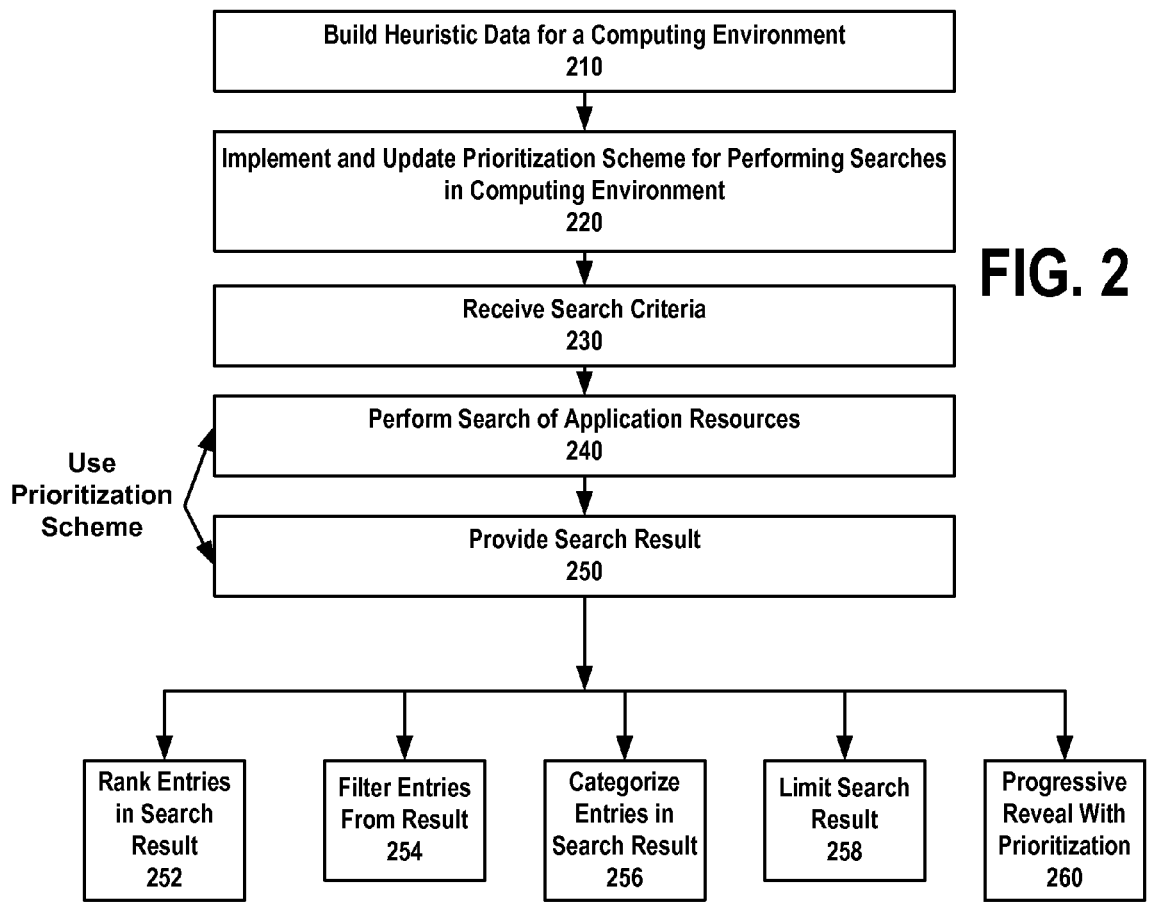
FIG. 2 illustrates a method for providing a search result in which search enhancements are used to prioritize or make selective the application data resources that are searched, under an embodiment of the invention.

FIG. 2 illustrates a method for providing a search result in which search enhancements are used to prioritize or make selective the application data resources that are searched, under an embodiment of the invention. A method such as described by FIG. 2 may be implemented in various forms of computing environments. In one implementation, a method of FIG. 2 is implemented on a small form-factor computing device, such as a mobile device for enabling wireless communications (e.g. cellular device). In another implementation, a method of FIG. 2 is implemented between the mobile computing device, a work station, and/or server resources. Numerous other computing environments are contemplated, including stand-alone stations, or a specific user-account on a network of computing devices.

Step 210 provides that heuristic data is aggregated for a designated computing environment. As described with an embodiment of FIG. 1, the heuristic data may reflect applications that are utilized in the computing environment. The heuristic data may reflect frequency and/or recency of use of particular applications. Other embodiments may provide that the extent that a particular application is used is data itemed by the heuristic data. For example, the heuristic data may reflect which applications are most heavily used, as reflected by the amount of time an application is used, and/or the amount of use-interaction that takes place when the application is opened.

Step 220 provides that a selectivity and/or prioritization scheme is implemented and/or updated based on the collected heuristic data. The selectivity scheme may reflect what application data resources are to be searched in the computing environment, while the prioritization scheme may reflect a ranking or order in the applications that are searched.

Step 210 and step 220 may be performed prior to the search feature of the computing device being used. Step 230-250 may reflect at run-time operations. In step 230, a search criteria is received from a user of the computing environment. The search criteria may correspond to, for example, a word, phrase, string of characters, a file name, and/or a file or data type.

The prioritization and/or selectivity schemes implemented in step 220 may be used to perform one or both of steps 240 and 250. In step 240, application data resources corresponding to the data items, documents, files, and other data items used or associated with applications of the computing environment are searched. If a prioritization scheme is implemented in step 240, the application data resources are searched in an order, ranking or sequence, as specified at least in part by the prioritization scheme. If the selectivity scheme is implemented in step 240 as an alternative or addition, specific application data resources are searched at the exclusion of other application data resources. According to an embodiment, both schemes may be implemented concurrently. For example, the selectivity scheme may be implemented to exclude a set of application data resources from the search, and the prioritization may be implemented to rank the remaining applications (and their respective data resources) of the computing environment.

The search result is provided to the user in step 250. The search result may contain one or more entries that are deemed to satisfy the search criteria of the user. If the prioritization scheme is implemented as part of step 250, the ordering of the entries in the search result is affected. If the selectivity scheme is implemented as part of step 250, what entries are displayed to the user may be effected. Sub-steps 252-260 provide specific examples of how prioritization and/or selectivity may be implemented to provide the search result of step 250. Each sub-step may be performed as an alternative to the other sub-steps, or in combination with one or more of the other sub-steps.

In sub-step 252, the entries that comprise the search result are ranked. As the heuristic data may identify what applications are most likely of interest to the user, the entries that represent data items or data items of those identified applications may receive prominence. Under one or more implementations, the prominence may be provided in the order of the entries when displayed (e.g. entries of the application of most interest is first on the list), and/or by visual markers.

In sub-step 254, some entries that would otherwise comprise the list of the search result may be filtered out, or otherwise excluded from the search result. For example, the selectivity scheme may identify only select applications. The search result may be filtered to exclude data items or data items that are used by applications that are excluded by the selectivity scheme.

In sub-step 256, entries in the search result may be categorized. The categorization may reflect the likely interest level of the user. For example, the entries for the applications that are most likely of interest may be provided in one folder or page, separate form other folders or pages.

In sub-step 258, the search result may be limited or truncated to reflect a designated set of entries (e.g. ten entries). The prioritization (or selectivity) scheme may determine which application data sources are searched to provide the designated set of entries. For example, if the most likely or preferred application (as determined by the heuristic data) provides all ten entries, no other applications may be searched or used to provide the result. But if the most likely or preferred application provides just one result, other applications may be searched (e.g. through an order selected by the prioritization scheme, or as default).

In step 260, the search result is provided using a progressive reveal, with prioritization of application data sources searched. In a progressive reveal, the computing device displays entries that match the search criteria as it finds them, rather than display all entries when the search is completed. In performing the progressive reveal, the prioritization scheme may be performed at least in part, so that at least some of the first results shown to the user are of a data type of one of the preferred applications.

The following provides an example of how one or more embodiments described with a method of FIG. 2 may be implemented. A user may enter on a mobile computing device a search criteria that corresponds to a word or name that is contained within a desired data item or document. The search may be performed by identifying what applications have most recently or commonly (the preferred applications) been used on the device. To save processing resources, the data items of those applications are searched first, or alternatively, to the exclusion of other data items. As an alternative, all data items and data items may be searched, but the search result may be filtered or configured to prioritize or put in prominence the entries of the preferred applications. Even if the entire search is performed, such a step preserves display space on the small form-factor device.

Figure 3:
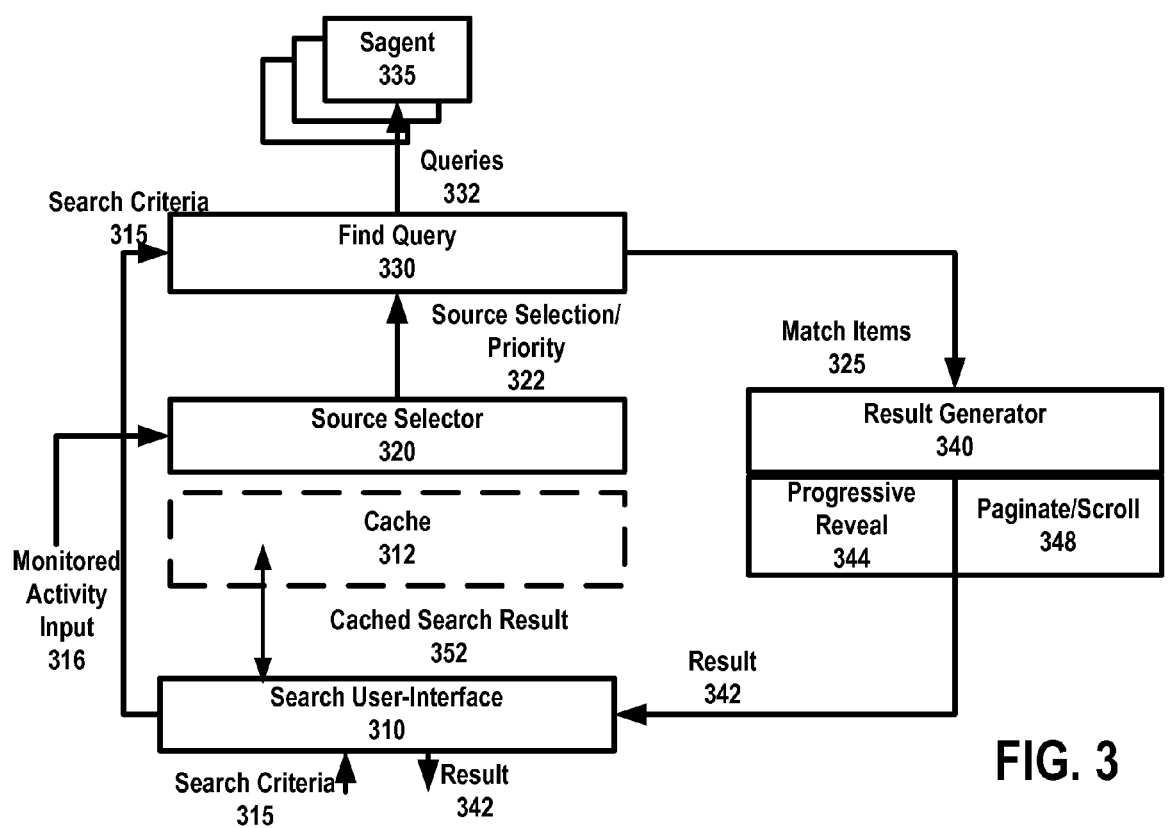
FIG. 3 illustrates components for a search module or program implemented on a computing environment, according to an embodiment of the invention.

FIG. 3 illustrates components for a search module or program implemented on a computing environment, according to an embodiment of the invention. In FIG. 3, a search system includes a search user-interface 310, a cache 312, a source selector 320, a find query generator 330, and a result generator 340. The search user-interface 310 may be configured to display search fields and other user-interface features to receive user-specified search criteria 315. In an embodiment, the search criteria 315 corresponds to a term, word, or string of characters, contained in data item (e.g. data item), portion of a data item, or part of a data item attribute (e.g. name). Other information, such as date when an item was created or modified, may also be used. The search user-interface 310 may also display a search result 342 when determined.

In an embodiment, the source selector 320 implements priority and/or selectivity in the application data sources to be searched. The application data sources may be identified by application and/or by data type. The source selector 320 may communicate its selectivity or priority input 322 to the find query generator 330. According to one embodiment, source selector 320 operates independently of the search user-interface 310 and/or other components of the system. The source selector 320 may receive monitoring input 316 or data from a component that monitors usage of individual applications in the system. In one embodiment, the component that provides the monitoring input 316 is part of the operating system, and provides information that counts or identifies individual applications that were opened.

The search user-interface 310 may communicate the search criteria 315 to the find query generator 330. The find query generator 330 uses the search criteria 315 to retrieve matching items 325. In an embodiment, the actual process of searching may be performed by one or more search agents or resources 335, which compare contents or attributes of data items with the criteria 325. In an embodiment, individual applications in the computing environment include their own inherent search functionality, and perform searches of data items used by the particular application. Thus, in such an embodiment, each application may search data items of a particular data type, and the search agents 335 correspond to the internal search functionality of the individual applications. The find query generator 330 may communicate the search criteria 315 to the search agents 335 by generating a search query for select applications to perform an internal search of data items used by that application.

In one embodiment, the find query generator 330 is selective about which applications it queries, based on the search or priority input 322 from the source selector 320. The source selector 322 may specify preferred applications, including most commonly or recently used applications. Under an embodiment, the source selector 330 may also factor in applications that have previously returned matching items 325 that were selected by the user. In an embodiment, the search or priority input 322 may specify (i) a set of one or more applications operable on the computing environment to search at the exclusion of other applications in the computing environment; (ii) a ranking, sequencing or other priority scheme for affecting a timing of how individual applications are searched as compared to other applications; and/or (iii) a combination of selecting the set of applications and implementing the priority scheme. The find query generator 330 may formulate individual queries 332 for select applications (via search agents 335) using the search criteria 315, where the targets for the applications queries 332 may be determined at least in part on the search or priority input 322. In addition, the timing of the application queries 332 may be affected by the search or priority input 322.

The result generator 340 may formulate the search result 342 from the matching items 325. The result generator 340 may include one or more return enhancements 342. In one embodiment, the enhancements may include a progressive reveal component 344, which displays matching entries 325 as they are returned. In an embodiment in which the prioritization scheme is implemented, the progressive reveal component 344 displays matching entries from the most highly ranked (e.g. most commonly, recently or extensively used) applications first, before other applications.

Another search enhancement that may be implemented with the result generator 340 includes a pagination/scroll feature 348. In one embodiment, the pagination/scroll feature 348 can aggregate multiple pages of matching entries 325, and enables the user to scroll through the resulting search result 342 page by page, or one entry at a time.

Numerous other enhancements may also be provided. In one embodiment, the result generator 340 can be navigated and reviewed repeatedly after the user performs other operations. Thus, for example, the user can open and view data items from the matching items 325, and if the desired data item is still not found, the user can return to the search result 340 and view another data item corresponding to another matching item 325 that is provided in the search result 342.

One or more embodiments provide for use of a cache component 312 to provide cached search result 352. In an embodiment, the search user-interface 310 communicates the search criteria 315 to the cache component 312. The cache component 312 maintains a list or index of past search criteria and matching items 325. In one embodiment, the cache component 312 also maintains which items of a past search result were selected. If the search criteria 315 was previously submitted by the user, the cache component 312 returns the cached search result 352 for that criteria. The cache component 312 may also place in prominence or return only the matching items 325 that were selected by the user from the past search result 342. Thus, the user can view the same search result each time he submits the criteria 315, unless the search needs to be updated or refreshed. If the criteria 315 was not previously submitted, the find query generator 330 is used.

While embodiments of FIG. 3 provide for the use of application data sources, other implementations may incorporate an index that stores index data items for multiple applications. In such an embodiment, the find query generator 330 (or a component that communicates with it) scans the index for data items of a particular type, as specified by the selection or priority input 322.

Still further, according to another embodiment, the selection or priority input 322 may alternatively or additionally be used by the result generator 340 to sequence, filter, rank, or sort the matching items 325 in the search result 342.

Figure 4:
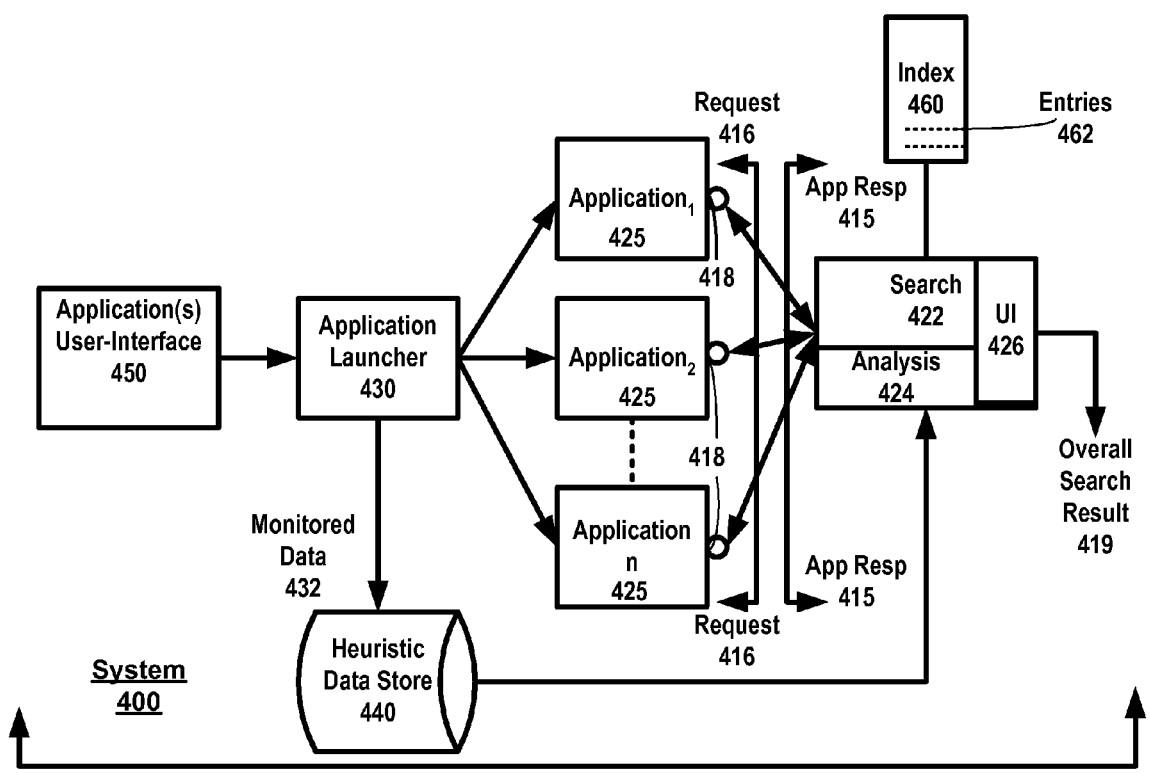
FIG. 4 describes a system architecture for use with one or more embodiments described herein.

FIG. 4 describes a system architecture for use with one or more embodiments described herein. A system 400 (i.e. a computing environment) may be include a search module 420, a plurality of applications 425, an application launcher 430, a heuristic data store 440, and a user interface 450 for selecting and launching any of the plurality of applications 425. The system 400 may be implemented on any computing device, such as a mobile computing device capable of cellular data and voice communications.

In an embodiment, a user may operate the application interface 450 to select and launch one or more applications 425. The application interface may be provided by an operating system that executes with system 400. For example, the operating device of the mobile computing device may correspond to a PALM OS (manufactured by ACCESS INC.) or MICROSOFT WINDOWS MOBILE, manufactured by MICROSOFT CORP. Either operating systems may provide a view and/or default display that enables the user to select and launch applications.

Under one embodiment, the application launcher 430 may be incorporated as part of the operating system of the system 400. The application launcher 430 may monitor application activities by counting or otherwise tracking applications that are launched. Depending on the implementation, the application launcher 430 may track instances that individual applications are launched, and/or track one or more recently used applications. The monitored activities are communicated as monitored data 432 to the heuristic data store 440.

In an embodiment, the search module 420 includes a search component 422, an analysis component 424, and a user-interface 426. The user-interface 426 provides fields and/or other prompts and graphic features to enable the user to specify a search term and other criteria. The search component 422 implements an overall search process using the search criteria received through the user-interface 426. Under an embodiment such as shown in FIG. 4, the search process may leverage internal search functionality of the other applications 425. In such an embodiment, the search component 422 may forward a search criteria, based on data received through the user-interface 426, to one or more applications 425, using priority or selectivity as determined by the analysis component 424. Each application 420 may include an application program interface 418 which can receive a search request 416 from the search component 422. Each application 420 may be configured to perform a search of application data sources used by that application, and to return an application specific search result 415 to the search component 422. The search component 422 may compile, sort or organize the individual search results 415 for display as an overall search result 419 using the user-interface 426.

The analysis component 424 may control or configure the search process implemented by the search component 422 using data provided by the application launcher 430. In one embodiment, the analysis component 424 retrieves heuristic data 442 from the heuristic data store 440. The heuristic data store 440 may include raw data provided by the application launcher 430. Alternatively, the heuristic data store 440 may process the monitored data 432 provided by the application launcher 430. For example, the heuristic data store 440 may compile or aggregate the monitored data 432. The analysis component 424 uses the heuristic data 442 to implement selectivity and/or priority as to which of the applications 425 are used to perform a given search, at least at a given instance (e.g. initially) when a search criteria is received. In one embodiment, the analysis component 424 determines (i) which of the applications 425 are to be queried with the search request 416, (ii) specifies a timing as to when individual applications 425 are to be queried with the search request 416, relative to the other applications, and/or (iii) specifies which search results 415 are to receive priority over other search results. The latter priority designation may be implemented in the ordering, organization or filtering of the overall search result 419, provided by the search component 422 and displayed through the user interface 426.

As an alternative or addition to the use of applications 425, an index 460 may be used to perform the search process by the search component 422. The index 460 may include index entries 462 that correspond to contents of individual data items of the applications 425. In an embodiment, the analysis component 424 may specify selectivity or priority as to specific applications or application data types of data items that are scanned. The search component 422 may scan the index 460 for the data items, based on data type specified by the analysis component 424. Alternatively, the search component 422 may scan the index 460 for entries regardless of data type, and have the priority or selectivity implemented with the display of the overall search result 419.

Other enhancements may be provided by the search module 420. The search module 420 may include a cache (not shown) of past search results, and re-display a search result if the user re-enters a specific search term. In another implementation, the search component 422 and the user-interface 426 may be configured to implement a progressive reveal of matching data items. For example, the search component 422 may sequence its queries to individual applications based on a priority specified by the analysis component 424. Matching entries from each application-specific search result 419 may be displayed as part of the progressive reveal.

Figure 5:
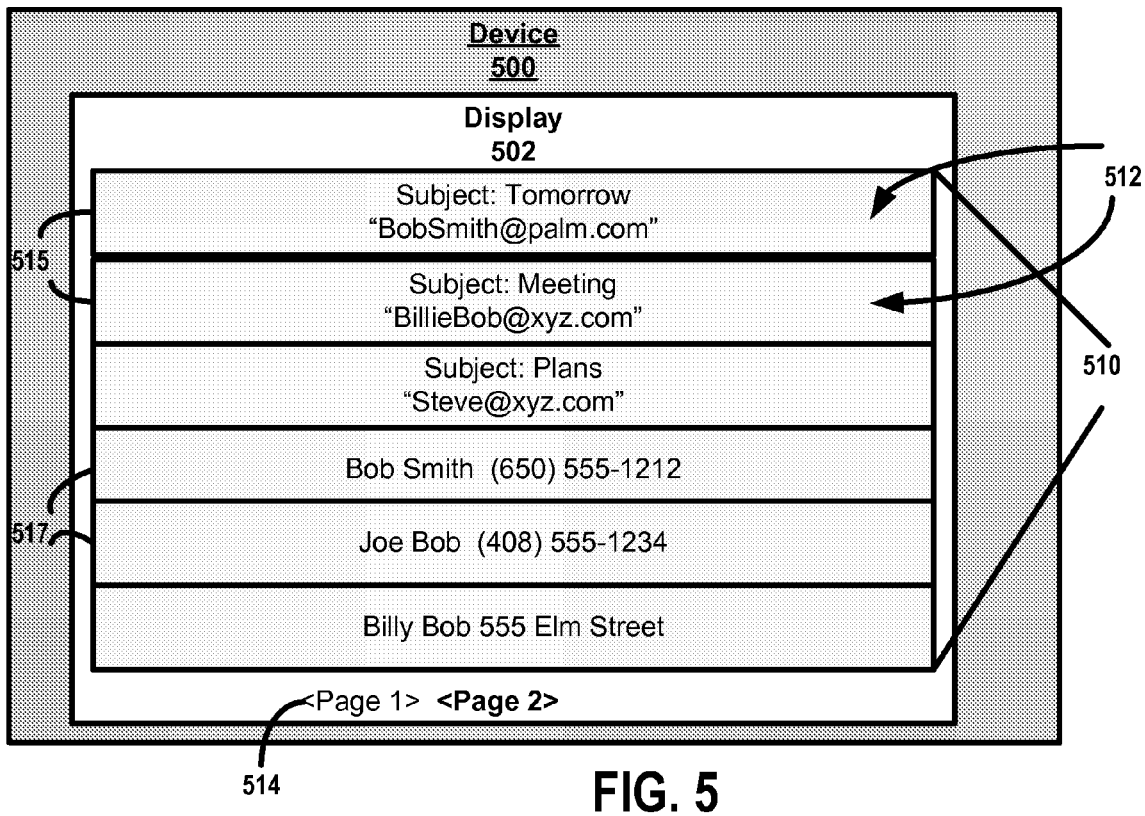
FIG. 5 illustrates an example of how an overall search result may be provided on a computing device, under an embodiment of the invention.

FIG. 5 illustrates an example of how an overall search result may be provided on a computing device, under an embodiment of the invention. FIG. 5 illustrates, for example, one implementation of an embodiment such as described with FIG. 4, or elsewhere in this application. The computing device 500 may be in the form of a mobile computing device, such as a cellular telephony and messaging device. The device 500 may include a small display 502. A search result 510 may be provided on the display 502 and comprise individual entries 512 that match a user-specified search term ("Bob"). The search result 510 may be provided by, for example, system 400 (i.e. and thus correspond to overall search result 419).

In an implementation such as shown by an embodiment of FIG. 5, the relatively small size of display 502 limits the number of entries 512 provided with the search result at one time to be six. Additional pages of entries 514 may be accessed to view additional entries. An implementation such as shown by FIG. 5 assumes that the application that receives the highest priority or preference is the email application, followed by the contact data item application. Accordingly, all the email data items 515 that match the search term "Bob" are displayed first, followed by contact data items 517 that match "Bob". The standard for determining if an individual data item is a match to a search term may be determined by the application and/or by the search process (e.g. search header information of email, but not its body).

According to one or more embodiments, the user may scroll or navigate to the other pages to see matching data items from other applications. If a priority scheme is implemented, all matching data items may be displayed as entries in consecutive pages, but the ordering of the entries is set by a ranking or preference established through a monitoring of application activities. If a selectivity scheme is implemented, some matching data items are displayed, possibly on consecutive pages. The user may be given the option to search more applications if the desired result is not received.

Each entry that comprises the search result 510 may represent a corresponding data item. To this end, a portion of the data item may be displayed through the entry. With reference to an embodiment of FIG. 4, search module 420 may be configured to generate entries, and to fetch and/or display underlying data items of entries when such data items are selected by the user from viewing the search result 510 (FIG. 5). Moreover, the search module 420 may track entry selections of the user, and the analysis component 424 may use such past selections to affect the priority or selectivity that is established.

Other display features for rendering the overall search result 510 may be provided independently or in connection with one or more other embodiments. For example, in one embodiment, the search result may be held until the user-interface of the search module 420 (FIG. 4) is closed. In this way, the user can open an entry to view a matching data item, close the data item, then return to the search result to view another data item. Such an embodiment would reduce the amount of manual involvement required by the user to perform a search on the computing device.

Hardware Diagram

Figure 6:
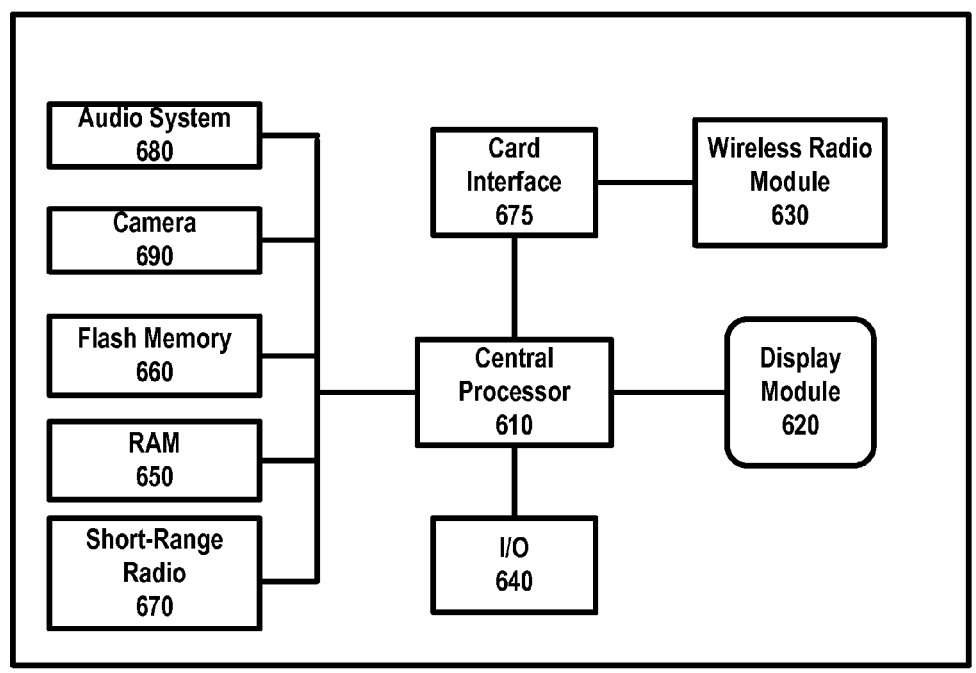
FIG. 6 illustrates hardware diagram for implementing one or more embodiments on a mobile computing device, according to an embodiment of the invention.

FIG. 6 illustrates hardware diagram for implementing one or more embodiments on a mobile computing device, according to an embodiment of the invention. In an embodiment, a computing device 600 includes a central process 610, a display module 620 (including a display, hardware components and firmware), a wireless radio module 630 for wide-area or cellular communications, one or more input devices 640 (e.g. small form-factor keyboard, touch pad with display, microphone, buttons or switches), RAM memory 650 and/or FLASH memory 660, short-range wireless component 670, speakers 680 and a camera 690. The processor 610 may execute instructions stored in RAM (and/or ROM) to implement a search process such as described with one or more embodiments provided herein. One or more embodiments may also include a card interface 675 for enabling accessory functions, programming and/or memory to be selectively interfaced with the processor 610.

Individual applications may be associated with various hardware components. For example, the wireless radio module 630 may be used with various messaging applications (e.g. email, Short Message Service, Multi-media Message Service), as well as a telephony application. The speakers 680 may be used with a music or multimedia playback application. The camera 690 may be used with a camera application. Other applications may be stored and executed in the memory, including telephony application for enabling cellular telephone calls, contact application, note application, memo application, as well as word processing and other related applications. For each application, RAM memory 650 or Flash memory 660 may hold data items, including database of data items (e.g. contact library) or directories of files (e.g. for use with word processing applications).

The processor 610 may implement a search system such as described with any of the embodiments provided herein. Any of the applications executed and/or associated with hardware components may be monitored for purpose of implementing a search system such as provided by one or more embodiments. Records, databases, and directories may be subjected to such the search process implemented by the processor 610.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for performing a search of data items, the method comprising:
    using one or more processors to execute instructions that cause the one or more processors to perform steps comprising:
        monitoring a usage of individual applications in a group of applications provided in a designated computing environment to determine a set of one or more applications that are to be prioritized for search operations, wherein an individual application in the set corresponds to one of (i) a most extensively used application in the group, (ii) a most commonly used application in the group, or (iii) a most recently used application in the group;
        receiving one or more search criteria from a user of the computing environment;
        performing one or more search operations on a collection of data items to identify a set of data items that satisfy the one or more search criteria, wherein each data item in the collection is usable by a corresponding one or more of applications in the group; and
        wherein performing the one or more search operations includes displaying a search result comprising one or more entries, wherein each of the one or more entries corresponds to at least one of the data items in the set of data items;
        wherein the one or more search operations are performed by prioritizing the set of data items from the collection of data items, the set of data items being of one or more types that correspond to the set of one or more applications that are to be prioritized for search operations.

2. The method of claim 1, wherein prioritizing the set of data items includes selecting the set of data items from the collection to the exclusion of other data items in the collection.

3. The method of claim 1, wherein displaying the search result is configured by one or more of (i) selecting a set of data items from the collection to the exclusion of other data items in the collection based on data generated from monitoring the usage of the individual applications in the group, and (ii) prioritizing one or more sets of data items from the collection over other data items in the collection based on data generated from monitoring the usage of the individual applications in the group.

4. The method of claim 1, wherein performing the one or more search operations includes (i) ranking the set of data items of the one or more types that correspond to the set of one or more applications that are to be prioritized for search operations over another set of data items of another data type, and (ii) displaying the search result by ordering entries that comprise at least a portion of the search result based on the determined ranking.

5. The method of claim 1, wherein monitoring a usage of individual applications includes recording data that is indicative of the usage of at least one or more of the applications in the group, the recorded data at least in part indicating which application in the group was most recently used or opened for use in the computing environment.

6. The method of claim 1, wherein the computing environment corresponds to a portable computer.

7. The method of claim 1, wherein the computing environment corresponds to a designated set of interconnected computing devices.

8. The method of claim 1, wherein performing the one or more search operations includes searching data items that are of the one or more types that correspond to the set of one or more applications before searching data items that are of another type that correspond to another application in the group, but not in the set of one or more applications that are to be prioritized.

9. The method of claim 1, wherein performing the one or more search operations includes searching data items that are of the one or more types that correspond to the set of one or more applications to determine a search result, without searching data items that are of another type that corresponds to another application in the group, but not in the set of one or more applications that are to be prioritized.

10. The method of claim 1, wherein performing the one or more search operations includes displaying data items that are of the one or more types in prominence over data items that otherwise satisfy the search criteria but are of a data type that corresponds to another application in the group, but not in the set of one or more applications that are to be prioritized.

11. A system for enabling search operations to be performed in a computing environment, wherein the system includes:
   one or more processors, provided as part of the computing environment, the one or more processors being configured to provide:
      a monitoring module to record information about a usage of individual applications in a group of applications that are operable in the computing environment;
      a source selection and analysis module to use the recorded information to identify a set of one or more applications in the group that are to be prioritized for search operation based on data from the monitoring module indicating that each of the one or more applications in the group is one of (i) a most extensively used application in the group, (ii) a most commonly used application in the group, or (iii) a most recently used application in the group; and
      a search module to use one or more search criteria in performing one or more search operations on a collection of data items that are provided with the computing environment, where the search module is configured to generate a search result from performing the one or more search operations;
      wherein the search module is coupled to receive the data from the source selection and analysis module, and
      wherein the search module is configured by the data of the source selection and analysis module in performing the one or more search operations by prioritizing a set of data items from the collection of data items, the set of data items being of one or more types that correspond to the set of one or more applications that are to be prioritized for search operations.

12. The system of claim 11, wherein the search module is configured by the data to perform one or more search operations on the set of data items at an exclusion of other data items in the collection.

13. The system of claim 11, wherein the monitoring module counts each instance that an application in the group is opened, and wherein the recorded information corresponds to a count of one or more applications in the group being opened.

14. The system of claim 11, wherein the search module is configured to perform the one or more search operations by communicating the search criteria to individual applications in the group to cause each of the communicated applications to perform an internal search for data items of that application that satisfy the search criteria, and wherein the search module is configured to communicate the search criteria to only the applications in the set of applications that are to be prioritized for search, at the exclusion of other applications in the group.

15. The system of claim 14, wherein the search module is further configured to use an application-specific search result returned by each of the applications in the set that are to be prioritized for search when generating the search result.

16. The system of claim 11, wherein the search module is configured to perform the one or more search operations by communicating the search criteria to individual applications in the group to cause each of the communicated applications to perform an internal search for data items of that application that satisfy the search criteria, and wherein the source selection and analysis module indicates the priority of one or more applications in the set that are to be prioritized for search over other applications in the group, and wherein the search module is configured to communicate the search criteria to the one or more applications in the set that are to be prioritized for search based on the priority.

17. The system of claim 16, wherein the search module is configured to communicate the search criteria to the one or more applications in a sequence that is based on the priority.

18. The system of claim 11, wherein the computing environment corresponds to a portable computer.

19. The system of claim 11, wherein the computing environment corresponds to a designated set of interconnected computing devices.

20. A computer readable medium that stores instructions for performing a search of data items, wherein the instructions, when executed by one or more processors, cause the one or more processors to perform steps comprising:
   monitoring a usage of individual applications in a group of applications provided in a designated computing environment to determine a set of one or more applications that are to be prioritized for search operations, wherein an individual application in the set corresponds to one of (i) a most extensively used application in the group, (ii) a most commonly used application in the group, or (iii) a most recently used application in the group;
   receiving one or more search criteria from a user of the computing environment;
   performing one or more search operations on a collection of data items to identify a set of data items that satisfy the criteria, wherein each data item in the collection is usable by a corresponding one or more applications in the group; and
   wherein performing the one or more search operations includes displaying a search result comprising one or more entries, wherein each of the one or more entries corresponds to at least one of the data items in the set;
   wherein the one or more search operations are performed by prioritizing a set of data items from the collection of data items, the set of data items being of one or more types that correspond to the set of one or more applications that are to be prioritized for search operations.

21. A method for performing a search of data items, the method comprising:
   using one or more processors to execute instructions that cause the one or more processors to perform steps comprising:
      monitoring a usage of individual applications in a group of applications provided in a designated computing environment to determine a set of one or more applications that are to be prioritized for search operations, wherein an individual application in the set corresponds to one of (i) a most extensively used application in the group, (ii) a most commonly used application in the group, or (iii) a most recently used application in the group;
      making a determination as to which of a set of data items from a collection of data items corresponds to the set of one or more applications that are to be prioritized for search operations;
      receiving one or more search criteria from a user of the computing environment;

performing one or more search operations on the set of data items to identify a plurality of data items that satisfy the one or more search criteria, wherein performing one or more search operations includes prioritizing the one or more search operations to be performed on the set of data items over other data items not in the set; and displaying a search result comprising one or more entries, wherein each of the one or more entries corresponds to at least one of the data items in the plurality of data items.

22. The method of claim 21, wherein monitoring a usage of individual applications includes recording data that is indicative of the usage of at least one or more of the applications in the group, the recorded data at least in part indicating which application in the group was most recently used or opened for use in the computing environment.

23. The method of claim 21, wherein the computing environment corresponds to a portable computer.

24. The method of claim 21, wherein the computing environment corresponds to a designated set of interconnected computing devices.

\* \* \* \* \*